United States Patent [19]
Bartell

[11] 3,739,823
[45] June 19, 1973

[54] DEVICE FOR CUTTING TREE STUMPS

[75] Inventor: Maurice J. Bartell, Duluth, Minn.

[73] Assignee: Barko Hydraulics, Inc., Duluth, Minn.

[22] Filed: Dec. 6, 1971

[21] Appl. No.: 204,897

[52] U.S. Cl. .................................. 144/2 N, 37/2 R
[51] Int. Cl. ............................................. A01g 23/06
[58] Field of Search ....................... 144/2 N, 2 R; 37/2 R

[56] References Cited
UNITED STATES PATENTS

| | | |
|---|---|---|
| 1,509,994 | 9/1924 | Carrol .................................. 37/2 R |
| 2,820,493 | 1/1958 | Davis .................................. 144/2 N |

Primary Examiner—Donald R. Schran
Attorney—Wicks and Nemer

[57] ABSTRACT

A device for cutting tree stumps including a support with a pair of cutters pivotally mounted thereon each cutter having a pair of side plates connected by a combination bottom end wall, the edge of each side plate bottom and end wall having a sharpened edge and the cutters in direct opposed relation and a hydraulic ram connected to each of said cutters and the support for pivotally moving said cutters together and apart for cutting a tree stump therebetween.

2 Claims, 4 Drawing Figures

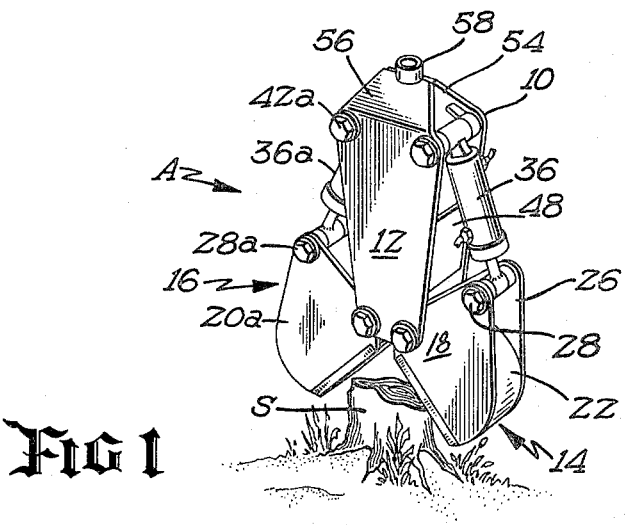

DEVICE FOR CUTTING TREE STUMPS

SUMMARY OF THE INVENTION

The invention relates to a device for cutting tree stumps and it is an object of the invention to provide such a device which can cut chunks from stumps whereby the stump is reduced to ground level or below or reduced to nothing in a minimal of time as compared to known devices.

In the drawings forming part of this application:

FIG. 1 is a perspective view of a device for cutting tree stumps embodying the invention.

FIG. 2 is a front elevational view.

FIG. 3 is a side elevational view thereof.

FIG. 4 is a perspective view of one of the cutter members removed from the device.

Referring to the drawings in detail the device for cutting tree stumps A includes the main opposed support plates 10 and 12 which pivotally mount the first box-like multiple cutting edge cutter member 14 and the second box-like cutter member 16. The cutter members 14 and 16 are identical, therefore only the member 14 will be described in detail with the identical parts being given the same number but with the added lower case letter *a*.

The cutter member 14 includes side walls 18 and 20 with the arcuate combination bottom and end wall member 22 secured thereto. The sidewalls 18 and 20 are each formed with an extension portion 24 and 26, respectively, and mounted on the outer end of the walls 18 and 20. The walls 18 and 20 are each formed with a bevelled cutting edge as at 27 and the lower edge of the wall member 22 is formed with a bevelled cutting edge 29. Thus the cutter 14 presents three cutting edges. These three cutter edges are brought into cutting contact with the three opposed cutter edges of cutter 16.

The numeral 32 designates a bearing mounted on the lower pin 28 and connected to the bearing 32 is the outer end of the piston rod 34. The rod 34 extends from within the hydraulic cylinder 36, and on the inner end thereof there is a piston 38 actuated by conventional means not shown. The upper end of the cylinder 36 is secured to the bearing 40 mounted on the upper pin 42 and between the spacers 44. The pin 42 is mounted on and extends between the plates 10 and 12 at the upper ends thereof. Thus the cylinder lies in a plane parallel to and between the support plates 10 and 12.

The numeral 46 designates a pin which extends through the lower ends of the plates 10 and 12 and the upper portion of the walls 18 and 20 of the cutter member 14 whereby the cutter member is pivotally mounted upon the plates 10 and 12. The support plates 10 and 12 are braced by means of the spaced and substantially vertical webs 48 and 50 connected thereto together with the substantially horizontal plate 52 the uppermost ends of the support plates 10 and 12 are turned in as at 54 and 56 respectively, and secured to the connecter member 58 for connection with a boom or the like whereby the cutter A can be positioned adjacent a stump, such as S, for cutting up the same into pieces.

The connection of the cutter 16 with the device A and the operation thereof is identical with cutter 14 and identical numbers indicating identical parts are used but accompanied with a lower case letter *a*. Additionally, the hydraulic cylinders are generally actuated simultaneously by conventional means not shown as used to cut away portions of a stump. However, one cutter 14 could be actuated first and then the cutter 16 actuated if desired in a particular situation where, for example, space or access was strictly limited.

It will be seen that with the cutters 14 and 16, each with the three opposed cutter edges adapted to come together in cutting relation in a box-like formation the cutting away of pieces of the stump S is accomplished with ease, control and speed not heretofore accomplished together with the fact that the box-like cutters carry within the same pieces of stump when desired.

I claim:

1. A device for cutting tree stumps:
   a. a first support plate,
   b. a second support plate,
   c. means connecting said support plates in spaced parallel relation,
   d. a first cutter member pivotally mounted on the lower ends of said support plates,
   e. a second cutter member pivotally mounted on the lower ends of said support plates in opposed relation to said first cutter member,
   f. a first hydraulic ram pivotally connected at its upper end to the upper ends of said support plates and at its lower end to said first cutter member, and
   g. a second hydraulic ram pivotally connected at its upper end to the upper ends of said support plates and at its lower end to said second cutter member.
2. The device of claim 1 in which:
   a. each of said cutter members includes a pair of side plates having sharpened edges, and
   b. a bottom wall having a sharpened edge.

* * * * *